J. GODDARD.
PHOTOGRAPHIC SHUTTER.
APPLICATION FILED JULY 11, 1913.

1,090,046.

Patented Mar. 10, 1914.

Witnesses:

Inventor
Joseph Goddard
by
James L. Norris
Attorney

UNITED STATES PATENT OFFICE.

JOSEPH GODDARD, OF ROCHESTER, NEW YORK, ASSIGNOR TO SENECA CAMERA MANUFACTURING COMPANY, OF ROCHESTER, NEW YORK, A CORPORATION OF NEW YORK.

PHOTOGRAPHIC SHUTTER.

1,090,046. Specification of Letters Patent. Patented Mar. 10, 1914.

Application filed July 11, 1913. Serial No. 778,611.

*To all whom it may concern:*

Be it known that I, JOSEPH GODDARD, a citizen of the United States, residing at Rochester, in the county of Monroe and State of New York, have invented new and useful Improvements in Photographic Shutters, of which the following is a specification.

This invention relates to improvements in photographic shutters of the type adapted for use on cameras for the purpose of controlling the exposures, and the primary object of the invention is to provide an improved shutter whereby rebound of the exposure-controlling member thereof upon termination of instantaneous exposures is prevented, the invention in its preferred embodiment involving rebound checks which operate automatically, irrespective of the direction of movement of the shutter, and coöperate with and are released by the shutter-operating member when the latter is actuated to make an exposure.

To these and other ends, the invention consists in certain improvements, and combinations and arrangements of parts, all as will be hereinafter more fully described, the novel features being pointed out particularly in the claims at the end of the specification.

Figure 1:
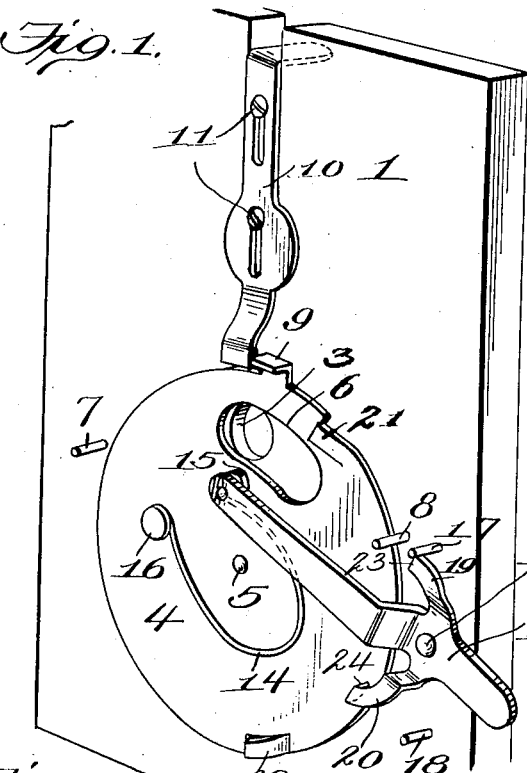
Figure 2:
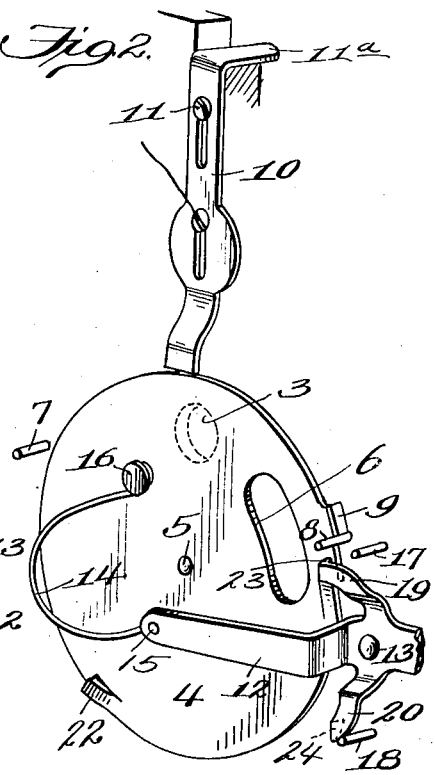
Figure 3:
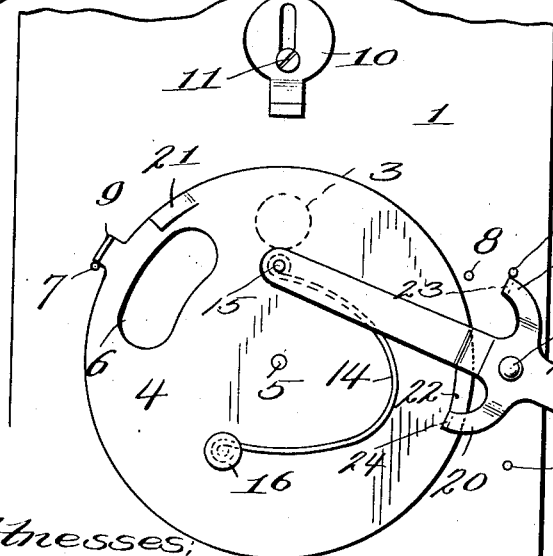
Figure 4:
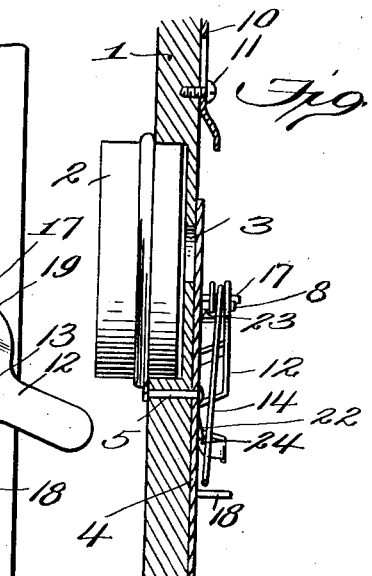

In the accompanying drawing: Figure 1 is a perspective view of a photographic shutter constructed in accordance with the present invention, the exposure-controlling member being shown in position to make a time exposure; Fig. 2 is a view similar to Fig. 1 showing the shutter in closed position after making a time exposure; Fig. 3 shows the shutter set for making an instantaneous exposure; Fig. 4 represents a transverse section through the shutter.

Similar parts are designated by the same reference characters in the several views.

In the photographic art, it is common to employ a shutter for controlling the passage of light through the lens of the camera and to the sensitized medium. One type of shutter embodies an exposure-controlling member actuated by a spring which carries an exposing aperture in the exposure-controlling member rapidly past the lens opening, the movement of the exposure-controlling member being arrested suddenly and upon termination of the exposure by a stop. Experience, however, has shown that in making rapid exposures of this kind and which are termed "instantaneous" exposures, the exposure-controlling member has a tendency to rebound or recoil upon striking the arresting stop, frequently causing the exposing aperture in the exposure-controlling member to again uncover the lens aperture and thereby produce over-exposure of the sensitized medium. This objection is obviated by the present invention, and in the preferred embodiment of the invention, the means which prevents such rebound operates automatically without requiring setting or other attention from the operator, and in applying the invention to shutters of the type wherein the exposure-controlling member shifts alternately in reverse directions in making instantaneous exposures, the non-rebound checks act automatically and are controlled by the shutter-actuating member.

The invention is shown in the accompanying drawing as applied to a shutter of the type employing an oscillating disk. It will be understood, however, that the invention is not restricted necessarily to a shutter of the particular type shown, nor is it limited to the specific construction shown, as equivalent constructions may be used and will be included within the claims at the end of this specification.

In the present instance, 1 designates the lens board or front of a camera which carries a lens 2 and is provided with the lens aperture 3. The shutter embodies an exposure-controlling member 4 which, in the present instance, is composed of a disk mounted to oscillate about a pivot or axis 5, this member having an exposing aperture 6 which is adapted to move past or to be brought into register with the lens aperture 3 in making instantaneous or time exposures. A pair of stops 7 and 8 are provided, and the member 4 is provided with a projection 9 which is adapted to operate in an arc between the stops, the lens aperture being closed or covered when the projection 9 rests against one of the stops and being open when the projection 9 occupies a position approximately midway between the stops. When the projection 9 occupies the latter position, the shutter is in condition to make a time exposure, and in order to hold the shutter in such position, a time exposure-controlling stop 10 is provided, that shown being in the form of a slide which is guided to operate longitudinally on pins 11 and is provided with a projection 11ª which is exposed at the front of the camera and serves as a handle whereby this slide may be set either for time or instantaneous exposures. The lower end of the stop 10 is arranged to project into the path of the projection 9 on the exposure-controlling member of the shutter when the stop 10 is set for time exposure, as shown in Fig. 1, thereby arresting the movement of the shutter at a point where the exposing aperture therein registers with the lens aperture, and when the stop 10 is retracted, its lower end will be clear of the path of the projection 9 and the shutter may then oscillate without obstruction in a manner to carry the exposing aperture therein rapidly past the lens aperture.

The shutter is actuated by a member 12, preferably in the form of a lever, pivoted at 13 to the camera front, and a bow spring 14 forms an operative connection between a pin 15 on the inner end of the lever 12 and which shifts across the axis 5 of the shutter disk, and a pin 16 which is attached to the shutter disk. This spring 14 has a tendency to straighten or expand, and by shifting the lever 12 from one position into a reverse position, the pin 15 will be brought into such a position relative to the pin 16 on the shutter disk as to cause the shutter disk to reverse its position, the projection 9 moving from, for example, the stop 7, to the stop 8, and the exposing aperture in the shutter disk moving past the lens aperture, thereby effecting an instantaneous exposure. The next exposure is made by shifting the lever 12 into a reverse position which causes the spring 14 to act in a reverse direction on the shutter disk and thereby move the shutter disk in a direction to carry the projection 9 thereon from the stop 8 to the stop 7. The movement of the actuating lever 12 from one position to another is limited by a pair of stops 17 and 18 which are arranged in the present instance to coöperate alternately with a pair of arms 19 and 20 which latter extend in opposite directions from the lever 12. This lever 12 has a portion which projects outwardly beyond its pivot 13 and provides a handle whereby it may be manipulated easily.

In order to prevent rebound of the shutter upon termination of each instantaneous exposure, due to the striking of the projection 9 upon one or another of the stops 7 and 8, the present invention provides rebound checks. In the present embodiment of the invention, a pair of these checks is provided for the reason that the exposing member is shifted alternately in opposite directions in making successive exposures. In the construction shown, these rebound checks consist of a pair of tongues or lips 21 and 22 which are preferably struck from the metal composing the exposure-controlling disk and are bent laterally so as to project in oppositely inclined directions from the face of the disk, and the arms 19 and 20 of the lever 12 are formed with dogs 23 and 24, one of which projects over the disk and into the path of the appropriate tongue 21 or 22 when the lever is moved into one or the other of its two actuated positions. The tongues 21 and 22 have a yield or resilience which causes them to deflect laterally as they pass beneath the respective dogs on the lever 12, and when the shutter reaches the limit of its movement in either direction, the free end of the respective tongue abuts as a shoulder against the corresponding dog on the lever 12, thereby locking the shutter disk from backward movement due to the recoil produced by the striking of the projection 9 against the stop 7 or the stop 8 as the case may be, these tongues on the shutter acting in effect as latches which, however, are unlocked automatically when the actuating lever 12 is shifted into a position to effect the next succeeding exposure. Assuming, for example, that the shutter occupies the position shown in Fig. 3, the tongue 22 on the shutter will then be held by the dog 24. The next exposure is made by shifting the lever 12 into a reverse position, as shown in Fig. 2, this shifting of the actuating lever 12 moving the dog 24 thereon out of the path of the tongue 22 whereby the shutter disk is unlocked and capable of moving in a reverse direction, and the reverse position of the lever 12 causes the spring 14 to act upon the shutter disk in a manner to effect a reverse motion thereof whereby the exposing aperture therein is carried rapidly past the lens aperture making the exposure, and the projection 9 on the shutter disk strikes the stop 8 whereby the movement of the shutter disk is arrested. When the actuating lever 12 of the shutter is shifted to make this exposure, not only is the dog 24 thereon carried into a position to release the tongue 22, but the dog 23 on the lever 12 is brought into a position to coöperate with the tongue 21, and immediately prior to the striking of the projection 9 against the stop 8, the tongue 21 passes the dog 23 and the latter coöperates with the free end of this tongue to lock the shutter disk, thereby preventing rebound of the shutter disk. The same operation takes place when the lever 12 is shifted into a reverse position to effect the next exposure, and this lever 12 automatically unlocks the shutter disk when it is desired to make a time exposure, the time exposure being commenced by shifting the lever 12 in one direction whereby the stop 9 on the disk is brought against the stop 10, and this exposure is terminated by shifting the lever 12 back to its original position, whereupon the shutter returns to closed position.

From the foregoing it will be observed that rebounding of the shutter disk is prevented by means which are relatively simple and which do not require the attention of the operator, the rebound checks operating automatically and being controlled by the member which actuates the shutter.

I claim as my invention:—

1. In a photographic shutter, the combination of an exposing member, an actuating and releasing member therefor, and means controlled by the latter for preventing rebound of the former upon termination of an exposure.

2. In a photographic shutter, the combination of an exposing member, an actuating member therefor, and means for preventing rebound of said exposing member embodying a latch on one of the members, and a coöperative dog on the other member.

3. In a photographic shutter, the combination of an exposing member capable of movement in reverse directions, an operating member movable into positions to move the exposing member in reverse directions, and means for preventing rebound of the exposing member upon termination of exposing movement thereof, said means being operative to prevent reverse movement of the exposing member and releasable by said operating member to permit such movement.

4. In a photographic shutter, the combination of an exposing member capable of movement in reverse directions, an operating member movable into positions to move the exposing member in reverse directions, and means for preventing rebound of the exposing member upon termination of exposing movement thereof, embodying a pair of reversely arranged latches on one member, and a pair of dogs on the other member.

5. In a photographic shutter, the combination of an exposure-controlling member capable of movement alternately in reverse directions, stops for limiting the movement of said member in each direction, an operating member coöperative with said exposure-controlling member and capable of occupying reverse positions, and means on said members set in operative condition by said operating member for preventing rebound of the exposure-controlling member upon completion of its movement in each direction.

6. In a photographic shutter, the combination of an exposure-controlling disk capable of oscillation alternately in reverse directions, stops for arresting the oscillation of the disk in each direction, an operating member coöperative with said disk and adapted to be set in reverse positions to cause exposing movement of the disk, and means on said disk and member operative automatically to prevent reverse movement of the disk when arrested by one of its stops and permitting such reverse movement when said operating member is set in a reverse position.

7. In a photographic shutter, the combination of an apertured exposing member capable of movement alternately in reverse directions, an operating member therefor adapted to be set in reverse positions to cause exposing movement of the exposing member, reversely arranged latches on one of said members, and dogs on the other member, each dog adapted to coöperate with one of said latches to automatically prevent reverse movement of the exposing member and to release such latch when the operating member is set in a reverse position.

8. In a photographic shutter, the combination of an apertured exposing member having a yieldable lip struck therefrom, an operating member for the exposing member, and a dog on said operating member coöperative with said lip to prevent rebound of the exposing member upon completion of an exposure.

9. In a photographic shutter, the combination of an apertured exposure-controlling disk oscillatory in reverse directions and carrying reversely arranged latches, and an operating member therefor capable of being set in reverse positions and carrying a pair of dogs arranged to coöperate alternately with the respective latches when the operating member is set in its different positions.

In testimony whereof I have hereunto set my hand in presence of two subscribing witnesses.

JOSEPH GODDARD.

Witnesses:
J. A. Dyer,
N. A. Brannigan.